US011093526B2

United States Patent
Shmueli et al.

(10) Patent No.: US 11,093,526 B2
(45) Date of Patent: Aug. 17, 2021

(54) PROCESSING QUERY TO GRAPH DATABASE

(71) Applicant: Technion Research & Development Foundation Limited, Haifa (IL)

(72) Inventors: Oded Shmueli, Nofit (IL); Lila Shnaiderman, Bet Rimon (IL)

(73) Assignee: Technion Research & Development Foundation Limited, Haifa (IL)

( * ) Notice: Subject to any disclaimer, the term of this patent is extended or adjusted under 35 U.S.C. 154(b) by 437 days.

(21) Appl. No.: 15/935,182

(22) Filed: Mar. 26, 2018

(65) Prior Publication Data

US 2018/0210940 A1    Jul. 26, 2018

Related U.S. Application Data

(63) Continuation of application No. 14/187,540, filed on Feb. 24, 2014, now Pat. No. 9,928,287.

(60) Provisional application No. 61/768,479, filed on Feb. 24, 2013.

(51) Int. Cl.
*G06F 16/28* (2019.01)
(52) U.S. Cl.
CPC .................................. *G06F 16/28* (2019.01)
(58) Field of Classification Search
CPC .. G06F 16/28; G06F 16/9024; G06F 16/9027; G06Q 50/01
See application file for complete search history.

(56) References Cited

U.S. PATENT DOCUMENTS

| | | | |
|---|---|---|---|
| 6,691,166 B1 | 2/2004 | Gasior et al. | |
| 7,975,220 B2 | 7/2011 | Hattori | |
| 8,533,182 B1* | 9/2013 | Charboneau | G06F 16/90335 707/718 |
| 8,793,283 B1 | 7/2014 | Austern et al. | |
| 2006/0271506 A1 | 11/2006 | Bohannon et al. | |
| 2007/0220451 A1* | 9/2007 | Arnone | H04L 41/12 716/100 |
| 2008/0077926 A1 | 3/2008 | Jeter et al. | |
| 2008/0243908 A1* | 10/2008 | Aasman | G06F 16/28 |

(Continued)

OTHER PUBLICATIONS

Jürgen Ebert, A Versatile Data Structure For Edge-Oriented Graph Algorithm, 1987, ACME, all pages (Year: 1987).*

(Continued)

*Primary Examiner* — Tamara T Kyle
*Assistant Examiner* — Lahcen Ennaji

(57) ABSTRACT

A method of processing a query to a graph database using processors. The method comprises providing threads to be executed on processors, each the thread is associated with one of a plurality of unique thread identifiers, providing a graph database having a plurality of graph database nodes and a plurality of graph database edges, each the graph database edge represents a relationship between two of the plurality of graph database nodes, receiving a query tree that defines a tree comprising plurality of query nodes connected by a plurality of query tree edges, and searching at least part of the graph database for a match with the query tree, wherein the searching is executed by the processors, and wherein each processor searches one of a plurality of sub-graphs of the graph database, each the sub-graph is defined by one of the plurality of thread identifiers.

12 Claims, 9 Drawing Sheets

(56) References Cited

U.S. PATENT DOCUMENTS

| | | |
|---|---|---|
| 2010/0172269 A1* | 7/2010 | Hariharan ........... H04L 41/0233 |
| | | 370/254 |
| 2010/0312779 A1 | 12/2010 | Lim et al. |
| 2011/0153630 A1 | 6/2011 | Vernon et al. |
| 2012/0173541 A1 | 7/2012 | Venkataramani |
| 2013/0086127 A1* | 4/2013 | Pogmore ................ G06F 16/81 |
| | | 707/803 |
| 2013/0198109 A1 | 8/2013 | Rosenberg |
| 2013/0212131 A1 | 8/2013 | Reddy |
| 2014/0012882 A1 | 1/2014 | Poppitz |
| 2014/0172914 A1* | 6/2014 | Elnikety ............. G06F 16/9024 |
| | | 707/774 |
| 2014/0244687 A1 | 8/2014 | Shmueli et al. |
| 2017/0169133 A1* | 6/2017 | Kim .................... G06F 16/2237 |

OTHER PUBLICATIONS

Notice of Allowance dated Nov. 16, 2017 From the US Patent and Trademark Office Re. U.S. Appl. No. 14/187,540. (7 pages).
Official Action dated May 4, 207 From the US Patent and Trademark Office Re. U.S. Appl. No. 14/187,540. (22 pages).
Restriction Official Action dated Oct. 5, 2016 From the US Patent and Trademark Office Re. U.S. Appl. No. 14/187,540.

* cited by examiner

PROCESSING QUERY TO GRAPH DATABASE

RELATED APPLICATIONS

This application is a continuation of U.S. patent application Ser. No. 14/187,540 filed on Feb. 24, 2014, which claims the benefit of priority under 35 USC 119(e) of U.S. Provisional Patent Application No. 61/768,479 filed on Feb. 24, 2013, the contents of which are incorporated herein by reference in their entirety.

FIELD AND BACKGROUND OF THE INVENTION

The present invention, in some embodiments thereof, relates to processing a query to a graph database and, more specifically, but not exclusively, to processing a query to a graph database that is performed using multiple processors. The methods and systems described herein take advantage of multiprocessing hardware that is nowadays highly accessible and available and harnessing the multiprocessing platforms to processing queries to the graph database.

Graph databases have become popular as structures for data storage. The graph database provides a visually coherent and intuitive presentation of the data it holds allowing a human to easily follow a data pattern and interactions between a plurality of data items and/or properties. Data items (also referred to as members) are stored as nodes in the graph database while relationships between various data items are presented as directional edges connecting the data nodes.

Reference is now made to FIG. 1 which is a schematic illustration of an exemplary graph database and an exemplary query to an exemplary graph database. A graph database 101 may include a plurality of nodes 103, each containing one or more data items and/or properties describing the data item. The nodes 103 are connected between themselves with a plurality of directional edges 104 describing the relationships between the plurality of nodes 103. Each of the nodes 103 includes a node identifier and one or more data items and/or properties. Each of the edges 104 includes an identifier and is associated with an edge group (edge type). The edge 104 may include additional information with respect to the relationships between the nodes 103. A query 102 to the graph database 101 (usually expressed as a query applied to graph and/or a query against a graph) is also structured of nodes 103 and edges 104 and it basically asks for a sub-graph of the graph database 101 rooted at a root node 105. During processing of the query 102 a sub-graph within the graph database 101 which is isomorphic (i.e., same pattern indicated by the structure of the query 102) is searched for throughout the graph database 101 to identify a match. A match is identified when the structure of the query 102 is found within the graph database 101 with respect to the nodes 103 and the edges 104. Identifying a match of the query 102 against the graph database 101 may include a Boolean match, a specific node(s) (also referred to as target query node(s)) match and/or a complete match of the whole structure of the query 102 within the graph database 101. For Boolean match, the result of processing the query 102 produces a Boolean indication of a match—match or absence of match. Processing a target query node refers to identifying a match of the complete query sub-graph but reporting one or more of the nodes of the query 102 within the graph database 101, and a complete match describes a match of the complete query 102 against the graph database 101.

Currently processing the query 102 to the graph database 101 is mainly performed sequentially. A single search is performed at a time in which a specific sub-graph is searched for. In certain sub-domains, for example, XML processing there exist some parallel processing but not on a large scale.

As technology advances, multiprocessing hardware is becoming available, for example, multi core processors and/or hardware based on single instruction multi data (SIMD) architecture that are capable of simultaneously executing one or more threads. A thread is the smallest sequence of programmed instructions that can be managed independently by an operating system scheduler. SIMD platforms employ processor arrays in which a single instruction or operation may be processed in parallel over data arrays containing multiple data items which are mostly independent of each other. The combination of a multi-threading platform coupled with a SIMD architecture allows for massive vector processing enabling parallelization in processing large data arrays containing data items that are mostly independent of each other. An example of SIMD platforms is a graphic processor unit (GPU) which is very wide spread in processing stations, for example desktop computers, laptop computers and/or servers. GPUs are designed to process display data and have evolved to include massive arrays of processors to effectively and quickly process high resolution, high definition display data for fast moving scenes, for example, motion pictures and/or for gaming applications.

Multiprocessing platforms may be used for many other applications other than graphic and video processing. Applications which may have no and/or limited dependency between data items which are involved in the processing may employ a vector processing approach using SIMD platforms in order to reduce processing time and support low latency systems. In order to execute applications using SIMD platforms, it is possible that the algorithms embodied within the applications, may require some modifications in order to execute on SIMD hardware.

SUMMARY OF THE INVENTION

According to some embodiments of the present invention, there is provided a method of processing a query to a graph database using a plurality of processors. The method comprises providing a plurality of threads to be executed on a plurality of processors, each the thread is associated with one of a plurality of unique thread identifiers, providing a graph database having a plurality of graph database nodes and a plurality of graph database edges, each the graph database edge represents a relationship between two of the plurality of graph database nodes, receiving a query tree that defines a tree comprising plurality of query nodes connected by a plurality of query tree edges, and searching at least part of the graph database for a match with the query tree, wherein the searching is executed by the plurality of the processors, and wherein each the processor searches one of a plurality of sub-graphs of the graph database, each the sub-graph is defined by one of the plurality of thread identifiers.

Optionally, each the sub-graph is defined according to a match between edges of said plurality of query edges and data graph edges, as indicated by at least a portion of said thread identifier, of said plurality of unique thread identifiers.

Optionally, each the sub-graph is defined according to a match between edge types of the plurality of query edges and at least a portion of the plurality of unique thread identifiers.

Optionally, the method further comprises reporting, according to an outcome of the searching, whether at least one node of the query tree is within the graph database.

Optionally, each of the plurality of sub-graphs is represented by a sub-graph identifier, the sub-graph identifier is formed via a concatenation of a plurality of edge fields, each the edge field is associated with a corresponding edge of the plurality of edges of the plurality of query nodes, the plurality of edge fields are arranged in order determined after enumeration of the plurality of query edges and the plurality of graph database nodes of the graph database.

More optionally, the size of each the edge field is sufficient for representing the maximum number of edges that are of the edge type of the corresponding edge that come out of any one of the plurality of graph database nodes of the graph database.

More optionally, further comprising the enumeration employs depth first search (DFS) order starting at a root node.

More optionally, further comprising the unique sub-graph identifier is represented in binary format.

Optionally, the method further comprises the unique thread identifier is represented in binary format.

Optionally, the method further comprises collecting results of the plurality of sub-graphs from the plurality of processors, aggregating the results to identify a presence or an absence of at least one match between query tree and a segment of the graph database and outputting a match indication.

More optionally, the method further comprises reporting at least one node within the graph database that corresponds to at least one corresponding node of the query tree.

Optionally, the searching is performed in a plurality of iterations when the number of the plurality of sub-graphs exceeds the number of the plurality of threads, during each the iteration part of the plurality of sub-graphs is processed according to the number of the plurality of threads.

Optionally, the method further comprises the query tree is first split into at least two partial queries, each the partial query is processed separately and results of the separate queries are aggregated to identify a match of the plurality of query edges within the graph database.

Optionally, the method further comprises the query tree is dynamically split into a plurality of partial query trees, the partial plurality of query trees are identified and logged into a partial query list during processing of a main part of the query tree, the plurality of partial queries are processed after completion of processing the main part of the query tree and results are aggregated to identify a match of the query tree within the graph database.

Optionally, the method further comprises at least two base nodes with respect to which the query is processed simultaneously by the plurality of threads when the number of the plurality of threads is at least double the number of the plurality of search sub-graphs created for one of the plurality of base nodes, the base node being a starting point in the graph database for searching for a match of the query within the graph database.

Optionally, the method further comprises the graph database is expressed using resource description framework (RDF).

Optionally, the method further comprises the query is an XML query and the graph database is an XML database.

Optionally, the method further comprises the query is an XML query and the graph database is an XML document.

Optionally, the method further comprises the processing includes analysis and filtering of an identified match result of the query tree within the graph database according to constraints that are provided with the query.

Optionally, the method further comprises the graph database is an undirected graph having a plurality of undirected edges, each one of the plurality of undirected edges is represented as two directed edges prior to processing the query to the undirected graph.

Optionally, the receiving comprises building a spanning tree from a graph representing a query, trimming edges from the graph to obtain a spanning tree of the graph.

More optionally, the method further comprises executing the spanning tree query and checking that the relationships designated in the graph, as represented by the trimmed edges, are satisfied by the data nodes into which the spanning tree nodes are mapped.

According to some embodiments of the present invention, there is provided a system of processing a query for graph database. The system comprises a plurality of slave processors which executes a plurality of threads, each the thread is associated with one of a plurality of unique thread identifiers, a storage which hosts a graph database having a plurality of graph database nodes connected by a plurality of graph database edges, each the graph database edge represents a relationship between two of the plurality of graph database nodes, and a control processor which receives a query tree that defines a tree comprising plurality of query nodes connected by a plurality of query edges, distributes a search for a match to the query tree by dividing at least part of the graph database, according to a match between edge type values of the plurality of query edges and at least a portion of the plurality of unique thread identifiers, to a plurality of unique search sub-graphs and distributing the search operation in each of the plurality of unique search sub-graphs to one of the plurality of threads, and simultaneously processes the plurality of unique search sub-graphs by the plurality of threads according to the distributing.

Optionally, the system further comprises the control processor collects results of the plurality of search sub-graphs from the plurality of threads, aggregates the results to identify at least one match of the query within the graph database, outputs a match indication and provides the at least one match.

Optionally, the system further comprises the plurality of slave processors is embedded within at least one single instruction multiple data (SIMD) hardware unit.

Optionally, the system further comprises the SIMD hardware unit is a graphic processing unit (GPU).

According to some embodiments of the present invention, there is provided a method of creating a graph database layout in memory. The method comprises constructing a nodes array that includes a plurality of node entries, each the node entry is associated with one node of a plurality of graph database nodes constituting a graph database, wherein the node entry includes a node identifier and an edge list describing a plurality of edges going out of the one node, constructing a plurality of edge arrays that include a plurality of edge entries, each edge array is associated with a type of edge, wherein each edge entry includes an edge identifier of one of a plurality of edges of the edge type and a destination node of the one edge, and constructing a plurality of node data arrays that include a plurality of data entries, each data array is associated with one of a plurality of data types associated with the plurality of data elements stored in at least one of the plurality of graph database nodes, wherein each data entry includes the node identifiers of at least one node in which the data element of the data type is stored.

Optionally, the system further comprises the graph database is an XML database.

Optionally, the system further comprises the graph database is an XML document.

Optionally, the system further comprises the graph database is expressed using resource description framework (RDF).

Optionally, the system further comprises the graph database is an undirected graph having a plurality of undirected edges, each of the plurality of undirected edges is represented as two directed edges in opposite directions, prior to constructing the nodes array, constructing of the plurality of edge array and constructing plurality of the nodes data arrays.

According to some embodiments of the present invention, there are provided systems and methods for processing a query to a graph database using a plurality of slave processors. The query to the graph database is received and a plurality of possibly existing, within the graph database, search sub-graphs are created according to the received query with respect to the graph database. Each of the search sub-graphs is encoded with a unique number which is the sub-graph identifier. The plurality of search sub-graphs is distributed to a plurality of threads that execute on the plurality of slave processors, each of the threads having a unique thread identifier. Distribution of the plurality of search sub-graphs to the plurality of threads is done by assigning each sub-graph to the thread whose thread identifier is identical to the sub-graph identifier. Each unique sub-graph identifier specifies a specific sub-graph within the graph database which the assigned thread needs to follow. A path through the graph database is a specific case of a sub-graph. The plurality of threads simultaneously processes the associated search sub-graphs and look for a match of the query following the sub-graph specification by interpreting their own thread identifiers as navigation instructions. The results from the plurality of threads are collected and aggregated to identify a match of the query or part of it within the graph database. After completion of processing, search results including match indication and a set of one or more matching patterns are outputted. In case no match was identified an absence of match indication is outputted.

The sub-graph identifier is a concatenation created by joining a plurality of edge fields whose size in number of bits is determined by the edge type of the specific query edges. The order of edge fields (for edges) is determined by advancing after enumerating the nodes of the query. The enumeration is such that a node can only be enumerated once its immediate predecessor node on the path from the root node to the enumerated node has been already enumerated. The size of each edge field is set to be sufficient for representing the maximum number of edges of the specific edge type that come out of any one of the plurality of nodes of the graph database.

Optionally, the path identifiers and the processor identifiers are represented in binary format.

More optionally, enumeration of the nodes of the graph database and the nodes of the query employs depth first search (DFS) order starting from the root node.

More optionally, a match of the query within the graph database relates to a match of the complete query pattern within the graph database and/or reporting a portion of a complete match within the graph database of only one or more target nodes of the query.

More optionally there is one or more base nodes in the graph database that match the root node of the query. Processing is repeated for each of the one or more base nodes.

More optionally, when the number of the plurality of threads is greater than the number of search sub-graphs created for a single base node, query processing for at least two base nodes are processed in parallel.

More optionally, processing the query is done in one or more iterations, when the number of the plurality of search sub-graphs greater than the number of available threads. During each iteration, part of the plurality of search sub-graphs is processed according to the number of available threads.

More optionally, the query is a split into at least two sub-tree queries that together span the original query, each of the sub-tree queries is processed separately and results of the separate processing are aggregated to identify a match of the complete query within the graph database.

More optionally, the graph database is expressed using resource description framework (RDF).

More optionally, the query is an XML query and the graph database is an XML database and/or an XML document. The XML query may be processed in one or more phases, during each phase a portion of the XML query is processed.

More optionally, the graph database and/or the query is an undirected graph for which a plurality of undirected edges is associated to the plurality of nodes to identify the structural layout of the graph database prior to processing the query to the graph database. Each undirected edge connecting a first node and a second node represents two directed edges, a first edge going from the first node to the second node and a second edge going from the second node to the first node.

More optionally, the plurality of threads is used to analyze the results of the search of a match of the query within the graph database, for example to filter match results according to constraints imposed by the user on the query's returned results' values.

According to some embodiments of the present invention, there are provided systems for processing the query to the graph database using a plurality of threads executed on a plurality of slave processors by creating a plurality of search sub-graphs with respect to the query. The processing sequence is controlled by a control processor that receives the query to the graph database and creates the plurality of search sub-graphs. The plurality of search sub-graphs is mostly independent of each other and may be processed in parallel to reduce latency and processing time. The control processor distributes the plurality of search sub-graphs to the plurality of the threads. The plurality of threads simultaneously processes their assigned search sub-graphs and look for a match of the query within their specific search sub-graph. The control processor collects the results of the plurality of search sub-graphs from the plurality of threads, aggregates the results to identify one or more matches of the query within the graph database. The control processor then outputs a match indication and provides the one or more matches.

Optionally, the plurality of slave processors is embedded within one or more single instruction multiple data (SIMD) hardware.

More optionally, the SIMD hardware is a GPU.

According to some embodiments of the present invention, there are provided methods for creating a graph database layout in memory to enable efficient identification of the graph database layout and easy navigation through the graph database. The graph database is laid out in memory and organized to include several data structures (arrays) holding information of the graph database nodes and layout. A nodes array is created which includes a plurality of node entries. Each node entry is associated with one node of the plurality of nodes constituting the graph database. Each node entry includes a node identifier, one or more data element that are stored in the node and an edge list describing the plurality of edges that are going out of the node. A plurality of edge arrays that include a plurality of edge entries. Each edge array is associated with a type of edge and each edge entry includes an edge identifier of one of the plurality of edges of the edge type and a destination node. A plurality of node data arrays that include a plurality of data entries is provided. Each data array is associated with one of a plurality of data types associated with the plurality of data elements stored in one or more nodes. Each data entry includes the node identifiers of one or more nodes in which a data element of the data type is stored.

Optionally, the graph database is an XML database and/or an XML document.

More optionally, the graph database is expressed using RDF.

More optionally, the graph database is an undirected graph for which a plurality of undirected edges is associated with the plurality of nodes to identify the structural layout of the graph database prior to constructing the plurality of nodes, edges and nodes data arrays.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
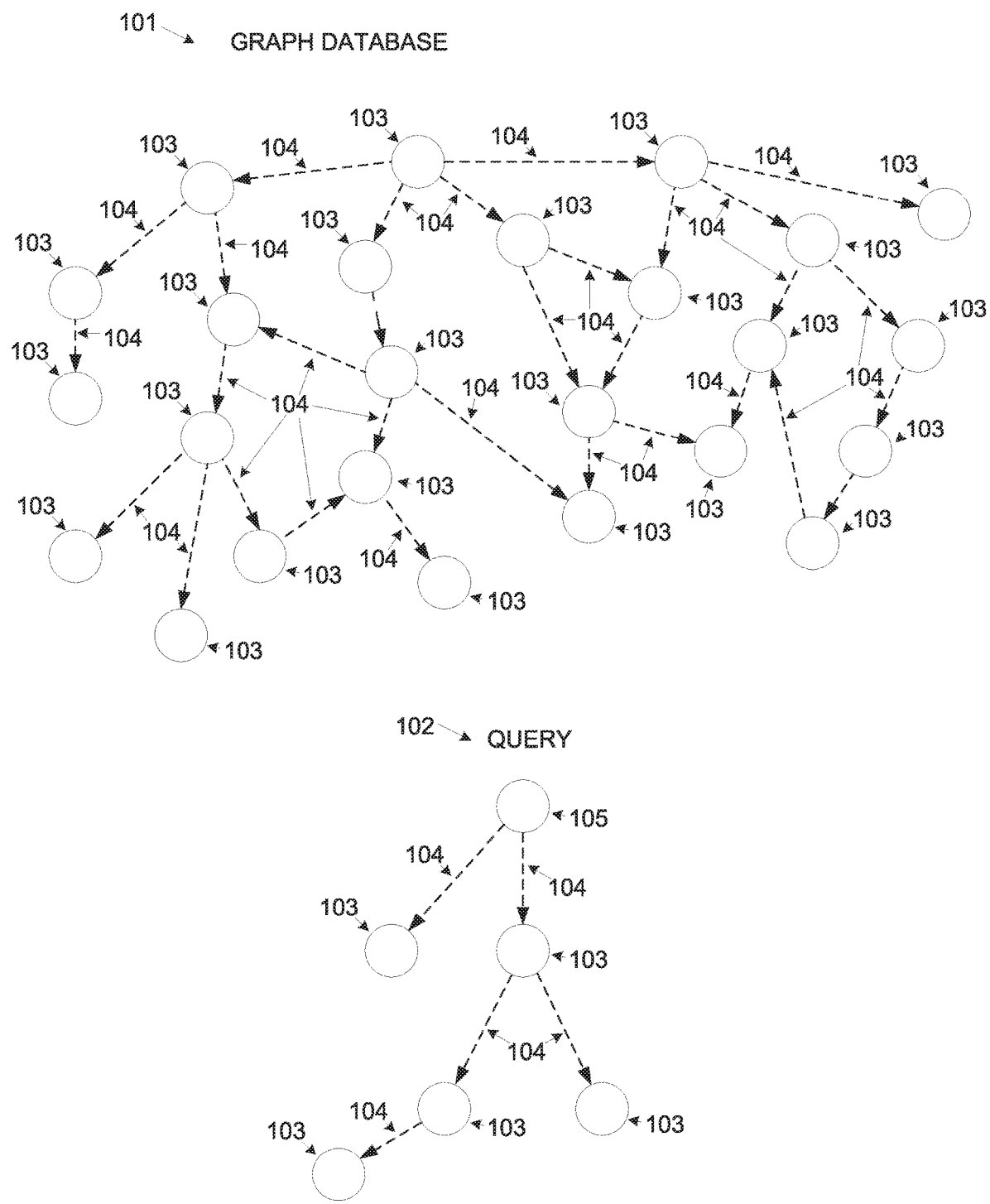
FIG. 1 is a schematic illustration of an exemplary graph database and an exemplary query to an exemplary graph database.

The present invention, in some embodiments thereof, relates to processing a query to a graph database and, more specifically, but not exclusively, to processing a query to a graph database that is performed using multiple processors.

According to some embodiments of the present invention, there are provided systems and methods for processing a query to a graph database. The system for processing the query 102 to the graph database 101 includes a control processing unit (physical or logical) that receives a graph database, such as 101 and a query, such as 102, creates a plurality of search sub-graph according to the query 102 with respect to the graph database 101 and distributes the plurality of search sub-graph to a plurality of threads that are executed on a plurality of slave processing units (physical or logical) that process the plurality of search sub-graphs simultaneously. The slave processing units may be facilitated through, for example, single-core and/or multi-core central processing units (CPUs), GPUs and/or other SIMD hardware units. Distribution of the plurality of search sub-graphs to the plurality of threads is done by associating search sub-graphs, each having a numeric representation with one of the plurality of threads according to a thread identifier that is inherent to each thread.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
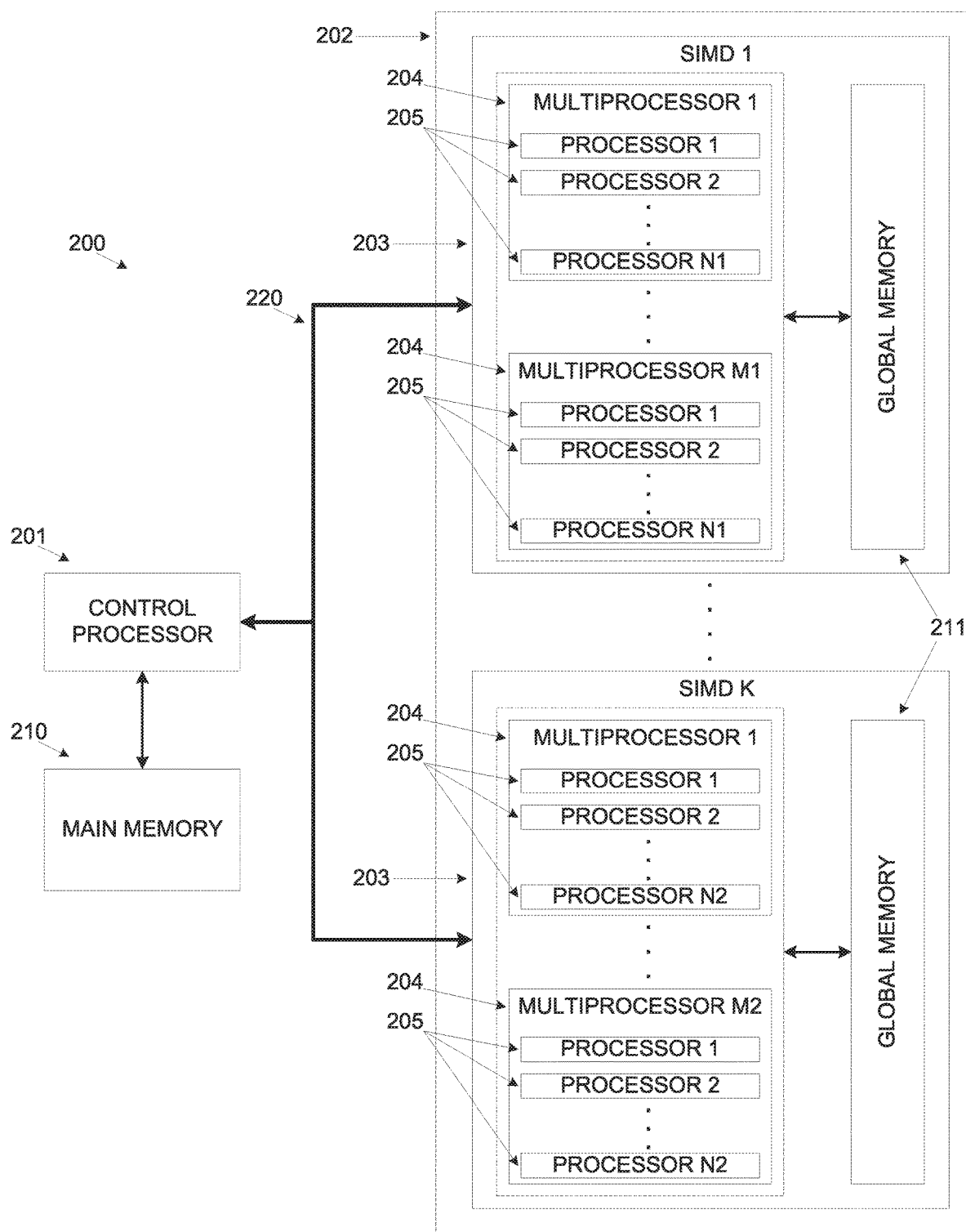
FIG. 2 is a schematic illustration of an exemplary system for processing a query to a graph database, according to some embodiments of the present invention.

Reference is now made to FIG. 2 which is a schematic illustration of an exemplary system for processing a query to a graph database, according to some embodiments of the present invention. The system 200 includes a control processor 201 (logical and/or physical) that controls processing the query 102 to the graph database 101. The control processor 201 has a supporting main memory 210 which is used during processing of the query 102. Processing the query 102 is performed by a plurality of threads executed on one or more slave processors 202 (logical and/or physical) which may be utilized through a plurality of platforms employing a plurality of hardware architectures, for example SIMD units 203. The SIMD unit 203 may include a plurality of multiprocessors 204 each containing a plurality of processors 205. Each processor 205 is capable of independently processing data. The SIMD 203 may include a memory array 211 serving the plurality of processors 205. The SIMD 203 may employ various architectures and implementations for the memory 211, for example, separate memory per processor 205, separate memory per multiprocessor 204, global memory serving processors 205 of a single multiprocessor 204, global memory serving multiprocessors 204, global memory serving the SIMD 203 and/or any combination of the aforementioned architectures.

During processing of the query 102, high volumes of data may be transferred between the control processor 201 and the plurality of slave processors 202. To accommodate transfer of the high volumes of data, high bandwidth, high-speed interconnecting devices, fabrics and/or networks 220 may be used, for example, PCI Express, HyperTransport, InfiniBand and/or Ethernet.

Figure 3:
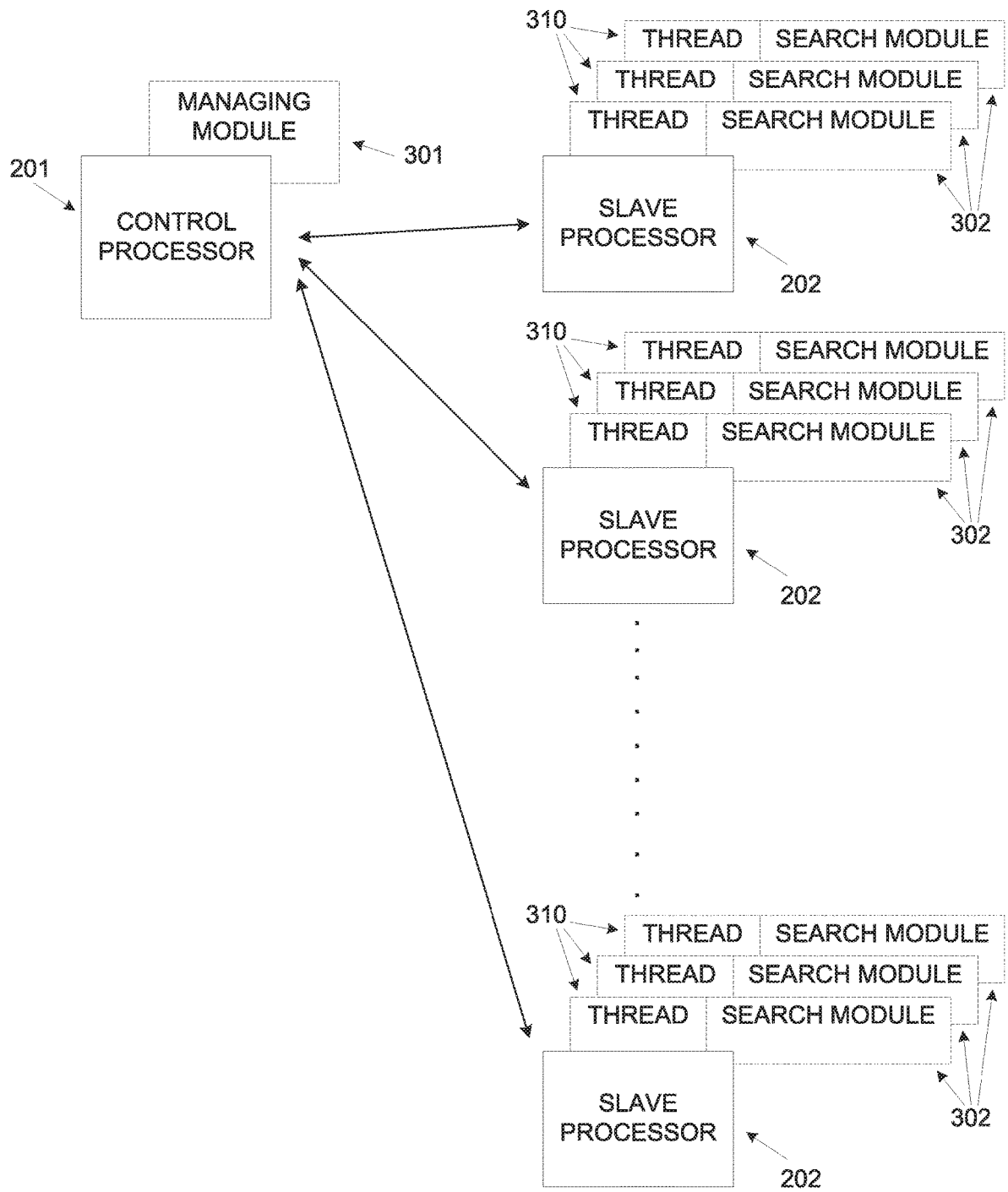
FIG. 3 is a schematic illustration of an exemplary system for processing a query to a graph database and optional execution modules that process the query, according to some embodiments of the present invention.

Reference is now made to FIG. 3 which is a schematic illustration of an exemplary system for processing a query to a graph database and optional execution modules that process the query, according to some embodiments of the present invention. A managing module 301 that is executed on the control processor 201 controls the query 102 processing. The managing module 301 receives the graph database 101 and the query 102 along with one or more base nodes which are starting points within the graph database 101 for processing the query 102. The managing module 301 manipulates the query 102 to create the plurality of search sub-graphs which may be performed by the plurality of threads 310 that execute on the plurality of slave processors 202. A search module 302 is executed by each of the plurality of threads 310 to identify a match of the query 102 with respect to a specific sub-graph within the graph database 101.

The method for processing the query 102 is based on creating the plurality of search sub-graphs according to the query 102 with respect to the graph database 101 and representing each of the search sub-graphs with a unique sub-graph identifier that encodes it. Each of the search sub-graphs is then associated with one of the threads 310 having a matching respective unique thread identifier. The thread identifier is an inherent property of the threads 310 which allows unique identification of each thread 310 among the plurality of threads 310. The search sub-graphs are mostly independent of each other and may be processed simultaneously by the plurality of threads 310. Each unique sub-graph identifier represents and encodes a unique specific (potentially existing) sub-graph within the graph database 101. The plurality of unique sub-graphs is independent of each other and may be processed simultaneously by the plurality of threads 310.

The unique sub-graph identifier that represents and encodes each of the plurality of search sub-graphs is generated by the managing module 301 after receiving the graph database 101 and the query 102 and enumerating their respective nodes. The sub-graph identifier is a concatenation of plurality of edge fields where the number of edge fields equals the number of edges 104 that are present in the query 102. Each of the edges 104 of the query 102 is associated with one of the edge fields of the sub-graph identifier according to the location of the edge 104 in the query 102. The edge fields in the sub-graph identifier are concatenated from right to left according to the location of their associated edge 104 in the query 102. The location of each edge 104 within the query 102 is identified according to the enumeration of the nodes as described above, for example using DFS order starting from the root node 105 of the query 102 and moving down and left to right through the nodes 103 of the query 102. The edge fields may be expressed as bit fields represented in binary format. The size of each of the plurality of edge fields is set to be sufficient to represent the maximum number of edges 104 of a specific edge type that come out of any one of the nodes 103 of the graph database 102, where the specific edge type is the edge type to which the associated edge 104 in the query 102 belongs.

Figure 4:
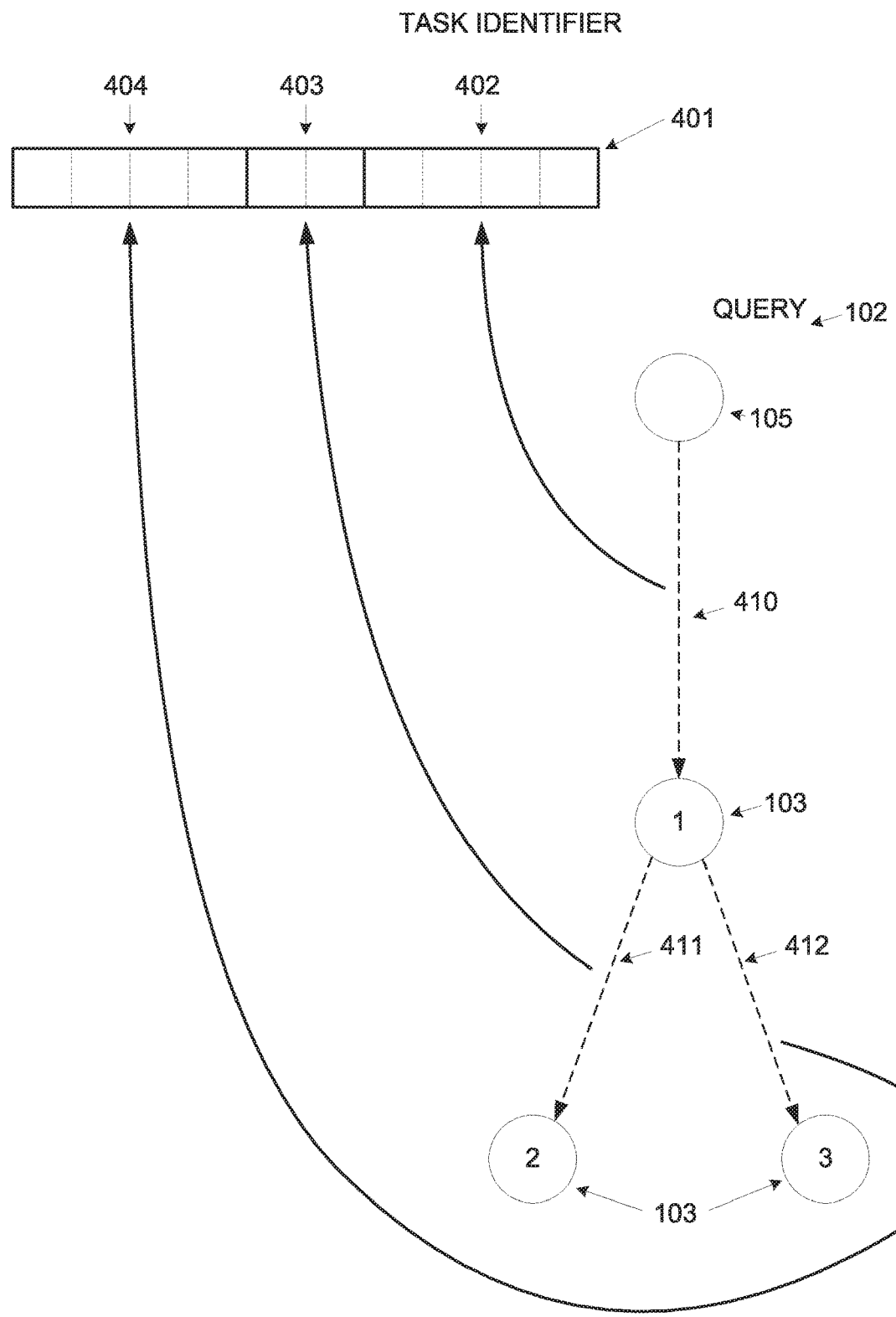
FIG. 4 is a schematic illustration of a structure of search sub-graph identifiers for an exemplary query to an exemplary graph database, according to some embodiments of the present invention.

Reference is now made to FIG. 4 which is a schematic illustration of a structure of search sub-graph identifiers for an exemplary query to an exemplary graph database, according to some embodiments of the present invention. A sub-graph identifier 401 is generated by the managing module 301 according to the structure of the query 102. The query 102 includes 3 edges 410, 411 and 412. Edge 410 is of edge type LABEL1, edge 411 is of edge type LABEL2 and edge 412 is of edge type LABEL1. The maximum number of edges 104 of type LABEL1 that come out of any one node 103 of the graph database 101 is 16, thus requiring 4 bits to represent each possible edge 104 that comes out of any one node 103 in the graph database 101. The maximum number of edges 104 of type LABEL2 that come out of any one node 103 of the graph database 101 is 4, thus requiring 2 bits to represent each possible edge 104 that come out of any one node 103 in the graph database 101. Therefore the size of an edge field 402 that is associated with the edge 410 (type LABEL1) is 4 bits, the size of an edge field 403 that is associated with the edge 411 (type LABEL2) is 2 bits and the size of an edge field 404 that is associated with the edge 412 (type LABEL1) is 4 bits. The edge fields 402, 403 and 404 are concatenated in the sub-graph identifier 401 with respect to the location of their associated edges 410, 411 and 412 in the query 401 as identified when moving from the root node 105 in DFS order towards the left most path of the query 102. The size of the path identifier 401 is 10 bits when concatenating the edge fields 402, 403 and 404.

Figure 5:
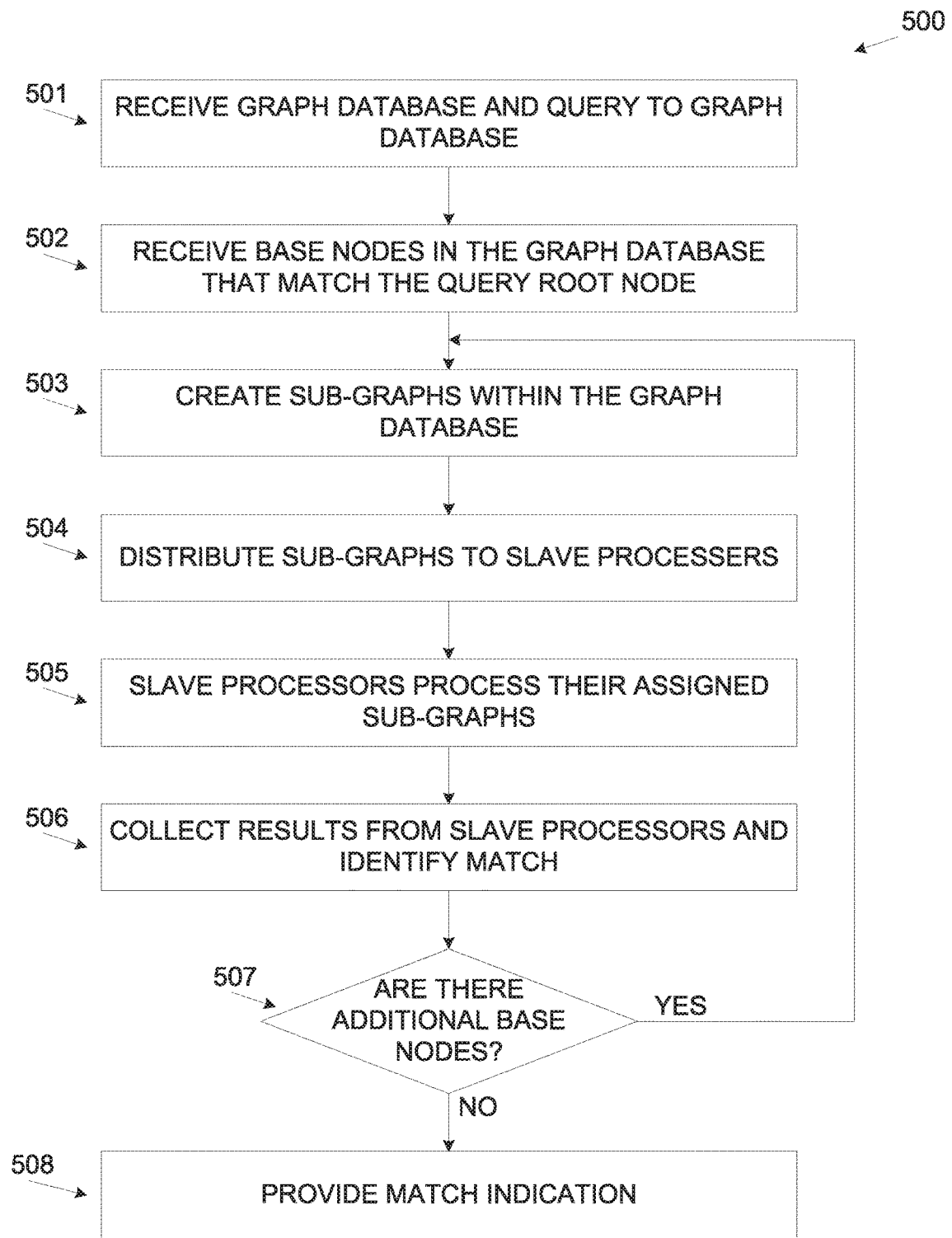
FIG. 5 is a schematic illustration of a process of processing a query to a graph database, according to some embodiments of the present invention.

Reference is now made to FIG. 5 which is a schematic illustration of a process of processing a query to a graph database, according to some embodiments of the present invention. A process 500 of processing the query 102 to the graph database 101 is started by receiving the query 102. As shown at 501, the graph database 101 and the query 102 are received.

As shown at 502, one or more base nodes in the graph database 101 are received as starting matching points for the query 102. The base node is a node 103 in the graph database 101 that matches the root node 105 of the query 102 by having the same label and label value as the root node 105. Each of the one or more base nodes is used as a base node to initiate a match search from.

As shown at 503, a plurality of search sub-graph are created and encoded with the unique sub-graph identifier according to the structure of the query 102 and the graph database 101.

As shown at 504, each of the plurality of search sub-graphs is associated with the respective one of the plurality of threads 310 having the matching identical thread identifier and the search sub-graphs are distributed to the plurality of threads 310 accordingly. As the basis for associating a search path with a thread 310 is the threads inherent thread identifier, association and distribution of the search paths is automatic.

As shown at 505, the plurality of search sub-graphs may be simultaneously processed by the search modules 302 that are executed by each of the plurality of threads 310. The plurality of unique sub-graphs is processed to identify a match to the query 102.

A match is identified when:
1) Each of the nodes 103 of the query 102 has the same labels as the respective node 103 of the graph database 101.
2) The structural relationships (directed edges and their types) of each of the nodes 103 of the query 102 is the same as the respective node 103 of the graph database 101.

As shown at 506, match results are collected from the plurality of search modules 302 executed by the plurality of threads 310.

As shown at 507, which is a decision point, in case there are additional received base nodes in the graph database 101 that are unprocessed, the process branches back to 503 and initiates an additional query processing sequence for the additional base node.

As shown at 508, after a match search is completed for all base nodes of the graph database 101 the process is terminated. The results collected from the plurality of search modules 302 are aggregated and a match indication is outputted together with all the match patterns identified within the graph database 101. A negative indication is outputted in case no match was found in the graph database 101 for the query 102. In some embodiments of the present invention, query results for some sub-graphs may be dynamically supplied to the user prior to accumulating the results of all sub-graphs.

Optionally, in order to reduce processing time when the query is to find a single match, the match search is completed when a match is found. This allows finding a positive answer to a match existence query more promptly. In such embodiments, the execution is stopped at the moment in which the first match is found. This feature decreases the running time of the execution (when positive answers are found) by about 10 times and sometimes even more.

Optionally, result data are returned incrementally, during the process of processing a query to a graph database. In this solution, the moment a match is found and/or not found, a status is presented or forwarded to the requesting entity. In such a manner, answers can be forwarded and used before a full answer is issued by the execution of the process.

The plurality of search sub-graphs is processed by the plurality of search modules 302 which are executed simultaneously by the plurality of threads 310. Each search sub-graph specifies a specific potentially existing sub-graph in the graph database 101 as encoded by the unique sub-graph identifier of the search sub-graph. The following is an exemplary processing sequence as executed by the search module 302:

1) Receive the graph database 101 and/or the relevant portion of the graph database 101.
2) Receive the query 102 to the graph database 101.
3) Receive a base node within the graph database 101.
4) Analyze the unique sub-graph identifier of the search sub-graph that is associated with the specific search module 302 and decode all the edge fields and their assigned values. Note that each thread knows its own thread identifier and that the unique sub-graph identifier is identical to the unique thread identifier.
5) Follow the edge 104 that comes out of the source node 103 (base node) that corresponds to the edge type and its sequence number among outgoing edges is the value of the first edge field of the sub-graph identifier and reach the destination node 103 in the graph database 101.
6) Identify if the destination node 103 matches the characteristics of the respective node 103 of the query 102.
7) If a match is successful, repeat steps 5 and 6 for the remaining edge fields of the unique path identifier. Continue processing the query 102 until all nodes 103 of the query 102 are processed.
8) If no match is identified during any of the steps 5 through 7, the search module 302 transmits no match to the managing module 301 and terminates.
9) If a match was identified between the query 102 and the sub-graph that was explored by the search module 302, the search module 302 transmits a match indication and the match pattern to the managing module 301.

Optionally, association of the sub-graphs with the threads is done by matching the sub-graph having as unique numeric representation as described herein with a thread having the thread identifier with the identical numeric value.

More optionally, when the query 102 is a directed graph structure having no specific root node, the query 102 is first split so as to create one or more sub-trees that together span the original query 102. Each of the one or more created trees out of the query 102 is individually processed by employing process 500 to find a match within the graph database 101. The results for each of the individual processing sequences are aggregated to identify a match of the complete query 102 within the graph database 101.

More optionally, the graph database is expressed using resource description framework (RDF), for example, RDF/XML, N3, Turtle and/or RDFa.

More optionally, the graph database 101 and/or the query 102 is an undirected graph having a plurality of undirected edges associated with the plurality of nodes to identify the structural layout of the undirected graph database and the relationships between the plurality of nodes. Prior to processing the query 102, each undirected edge is interpreted and represented as two directed edges going in the opposite directions. After the undirected edges are represented as directed edges the same process as described herein is applied to the undirected graph database.

More optionally, when the number of threads 310 twice or more the number of search paths, additional one or more base nodes (if exist) may be processed in parallel. A base node identification field is appended to the search path identifier to identify the specific base node that is processed by each of the search modules 302.

More optionally, when the number of search sub-graphs exceeds the number of the available threads 310, processing the query 102 is performed in a plurality of iterations. During each iteration, part of the plurality of the search sub-graphs is processed by the available threads 310. Iterations are repeated until all search sub-graphs are searched and results are transmitted back to the managing module 302. During each iteration, each of the plurality of search sub-graphs is assigned a virtual sub-graph identifier encoding the sub-graph it needs explore within the graph database 101. The virtual sub-graph identifier is built out of the iteration index field at the most significant part of the virtual sub-graph identifier and an offset field holding the sub-graph identifier. Each search sub-graphs is associated with one of the plurality of threads 310 via the offset field of the sub-graph identifier.

More optionally, when performing a plurality of iterations, physical collisions during accesses to memory are reduced by spreading the iteration index within the virtual path identifier avoiding linear increment of the virtual path identifier, thus allowing the plurality of threads 310 to process sub-graphs that are randomly spread within the graph database 101.

More optionally, when performing a plurality of iterations, sub-graphs of one or more iterations that use the same staring database graph node may share partial sub-graphs with each other. In order to avoid repetition of processing the sub-graphs that are common to two or more of the plurality of search sub-graphs, the results for the common shared sub-graph are stored. During iterations other than the first iteration, threads processing a specific sub-graph check previously stored results for sub-graphs that share the same sub-graph identifier within the virtual sub-graph identifier and avoid reprocessing the same sub-graph section.

More optionally, the plurality of threads is used to analyze the results of the search of a match of the query within the graph database, for example filtering match results according to constraints imposed by the user on the returned results' values of the query.

More optionally, processing the query 102 is done in two or more phases, during each of the two or more phases the process 500 is performed. Two or more phases are required, when for example the maximum number of edges 104 of a specific edge type is greater than the number of available threads 310 or more generally when the range of path identifiers exceeds the number of available threads 310. The query 102 is split into a limited query and one or more sub-tree queries. The limited query includes none of the edges 104 of the type that exceeds the number of available threads 310, in order to make it smaller and allow it to be represented within the range of the thread identifiers. The limited query is processed in the first phase and the partial match results (which are sub-graphs of the database graph) are stored and are used as starting point sub-graphs for the additional one or more phases. Additional one or more phases are performed for each of the one or more sub-tree queries. Processing the sub-tree queries during the additional phases is performed only for starting points identified by sub-graphs that were matched during the first phase.

More optionally, during each of the one or more phases, one or more iterations are performed to process all possible search sub-graphs in case the maximum number of edges 104 that come out of a single node 103 of the graph database 101 is greater than the number of available threads 310.

It should be noted that although sub-trees that together span the original query are referred to above, sub graphs that together span an original query may also be used. In such embodiments, queries which are in the form of a directed graph may be handled. For example, first a spanning forest is build out of a graph representing a query. Then, the above algorithm is executed on each tree in the forest. For example, the above search sub-graphs are these trees. Then, as the last step, all the answers for compatibility as checked so that the same query node is not mapped to different data graph nodes. Answers conforming to the graph structure of the query are retained.

When implementing the above described process (see FIG. 5), impressive results were obtained in comparison to the Gremlin tool in terms of run time to completion. For clarity, Gremlin is a domain-specific language hosted in Groovy language which itself is a superset of Java. The Gremlin tool is a query processor that uses a native graph approach and that supports XPath-style queries over graph documents. Using Gremlin's query language, one may express tree pattern queries (TPQs).

When using the above scheme to process documents that fully reside in the global memory of the GPU, a speedup of up to 1000 times is gained in comparison to Gremlin (counting the time of copying the results from the GPU to the CPU but not counting copying from the CPU to the GPU). Note that once a document is loaded to the GPU, many queries on this document may be processed sequentially, thus eliminating the need to copy the document, for each query, from the CPU to the GPU. For documents that cannot fully reside in the GPU global memory, according to our experiments, a significant improvement of up to 100 times in comparison to Gremlin (counting the time of copying the data from the CPU to the GPU and the time of copying the results from the GPU to the CPU) is gained. When an extra-large query is submitted, a speedup of up to 50 times in comparison to Gremlin is gained (while counting just the copying time of the results from the GPU to CPU), and up to 35 times in comparison to Gremlin (while counting the time of copying the data from the CPU to the GPU and the time of copying the results from the GPU to the CPU).

Figure 6:
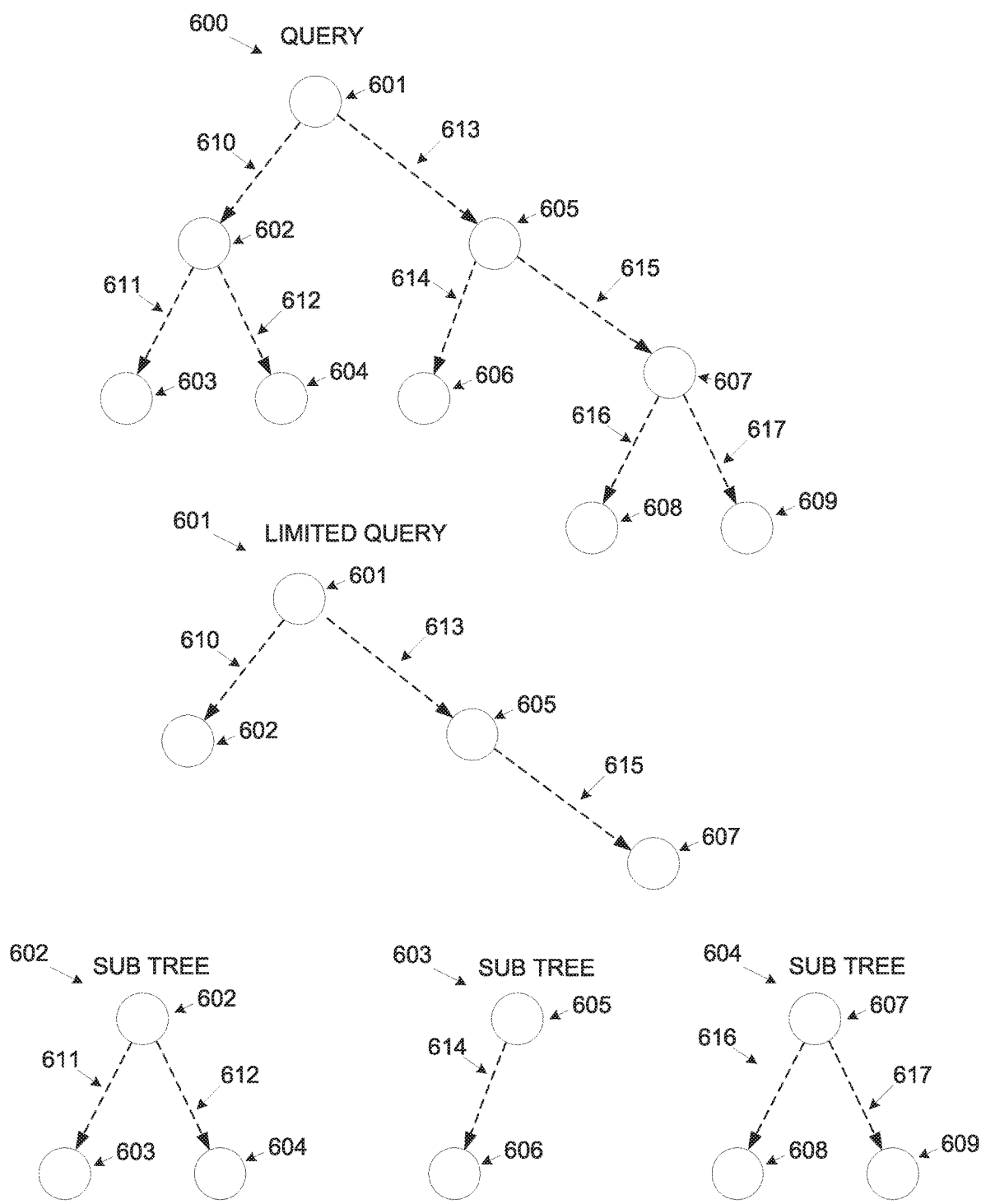
FIG. 6 is a schematic illustration of an exemplary multi phase processing of an exemplary query to an exemplary graph database, according to some embodiments of the present invention.

Reference is now made to FIG. 6 which is a schematic illustration of an exemplary multi phase processing of an exemplary query to an exemplary graph database, according to some embodiments of the present invention. A query 600 includes a plurality of nodes 601, 602, 603, 604, 605, 606, 607, 608 and 609 and a plurality of edges 610, 611, 612, 613, 614, 615, 616 and 617. The number of edge fields and/or the number of bits required for one or more of the edge fields result in the sub-graph identifier exceeding the number of available threads 310. To overcome this, the query 600 is split to a limited query 601 and sub tree queries 602, 603 and 604. During the first phase the limited query 601 is processed using the process 500 and the results are stored to be used as starting points for the sub-tree queries 602, 603 and/or 604. The sub-tree queries 602, 603 and 604 are processed in one or more phases using the process 500 and the results that were stored. Processing of sub tree queries 602, 603 and/or 604 is done only for starting points that are in continuation to sub-graphs in the graph database 101 that provide a match to limited query 601 as identified during the first phase. The managing module 301 aggregates the results received during the one or more processing phases to identify a match for each of the partial queries 601, 602, 603 and 604 within the graph database 101. The partial results are then aggregated again to identify a match of the query 600 within the graph database 101. The limited query 601 must have an overlapping node 103 with each of the sub tree queries 602, 603 and 604 in order to maintain continuation and synchronization between the partial matching processes which are each following the process 500.

More optionally, the query 102 is processed through a plurality of partial queries, each using the process 500, that are dynamically initiated during processing of the query 102, i.e., that partial queries are not identified before the start of processing the query 102. An extraordinary query list is created which is continuously updated during processing the query 102. Whenever one or more of the plurality of search modules 302 arrives at a node 103 of the query 102 that has a number of edges 104 of a specific edge type that exceeds the capacity of the path identifier size, the one or more search modules 302 logs an entry into the extraordinary list, the entry includes:

1) The node 103.
2) The edge type that has a number of edges 104 that exceeds the capacity of the path identifier size.
3) The final edge 104 of that type that was processed.

The search modules 302 continue processing the sub-graph they were assigned but do not follow the edges 104 of the edge type that was logged in the extraordinary query list beyond the final edge 104 that was logged. The managing module 301 monitors the extraordinary query list and issues a new query to the sub-graphs of the query 102 that are unprocessed. A plurality of iterations may be required to process all the edges 104 of the edge type that was logged in the extraordinary query list, since the number of edges 104 of that edge type exceeds the number of available threads 310.

More optionally, employing the extraordinary query list is used to process an XML query which may include descendant edges. Descendant edges imply that the complete sub-graph of a search path may be unknown in advance of processing the XML query. Using the extraordinary query list allows the search sub-graphs 302 to identify nodes which have descendants coming out of them and dynamically report them to the extraordinary query list; new queries are then initiated to process sub-graphs that were logged into the extraordinary query list and are still unprocessed.

Figure 7:
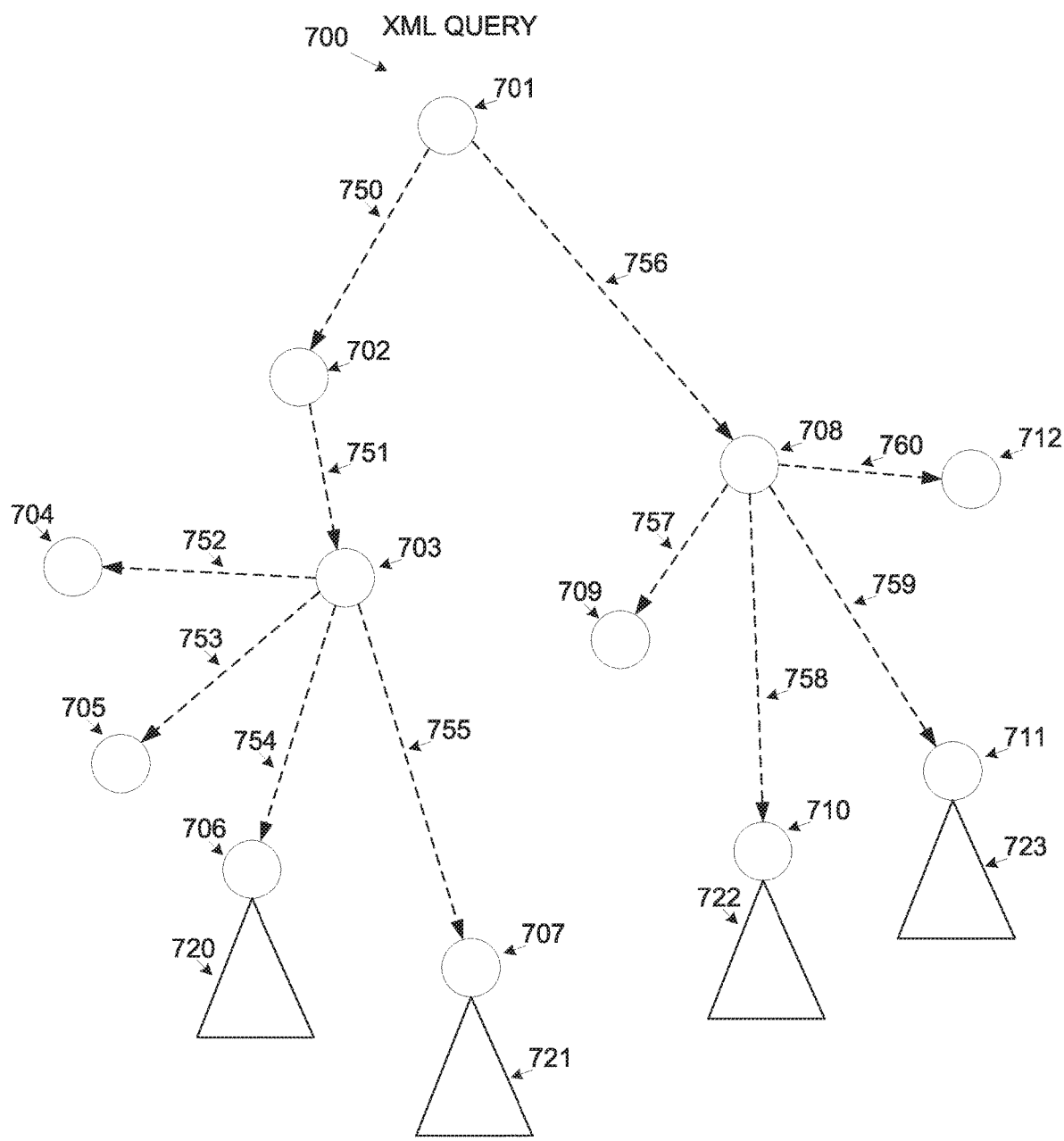
FIG. 7 is a schematic illustration of an exemplary multi phase processing of an exemplary XML query to an exemplary XML database and/or document, according to some embodiments of the present invention.

Reference is now made to FIG. 7 which is a schematic illustration of an exemplary multi phase processing of an exemplary XML query to an exemplary XML database and/or document, according to some embodiments of the present invention. An XML query 700 includes a plurality of nodes 701, 702, 703, 704, 705, 706, 707, 708, 709, 710, 711 and 712 and a plurality of unknown additional nodes 103 which may be connected through outgoing edges to sub-graphs 720, 721, 722 and 723. During the process 500, one or more of the nodes for example 706, 707, 710 and/or 711 may be identified as having outgoing edges preventing complete mapping of the query in advance. The process 500 of the query 701 is therefore using the dynamically updated extraordinary query list which is updated during the process 500. Processing the query 700 may be performed during one or more phases as described above. The search modules 302 executed during the one or more phases are updating the extraordinary query list whenever they discover a node 103 that includes descendant edges that are coming out of the node 103. The search modules 302 that process sub-graph having such a node 103 having descendant edges, log in the extraordinary query list the final edge 104 that was processed. The remainder of the descendant sub-graph is performed later by initiating one or more additional queries which may be processed in one or more phases. The managing module 301 keeps track of the dynamically updated extraordinary query list and issues additional one or more queries employing the process 500 in the unmapped path (sub-graph). For each processing phase the results are stored and maintained. The sequence is repeated until the entire XML query 700 is searched against the entire XML database and/or document. At completion of all phases the managing module 301 aggregates the results of the one or more partial queries to identify one or more matches of the XML query 701 and outputs the one or more matching patterns.

Some embodiments of the present invention, are presented herein by means of an example, however the use of this example does not limit the scope of the present invention in any way. The example presents an exemplary processing sequence of an exemplary query to an exemplary graph database.

Figure 8:
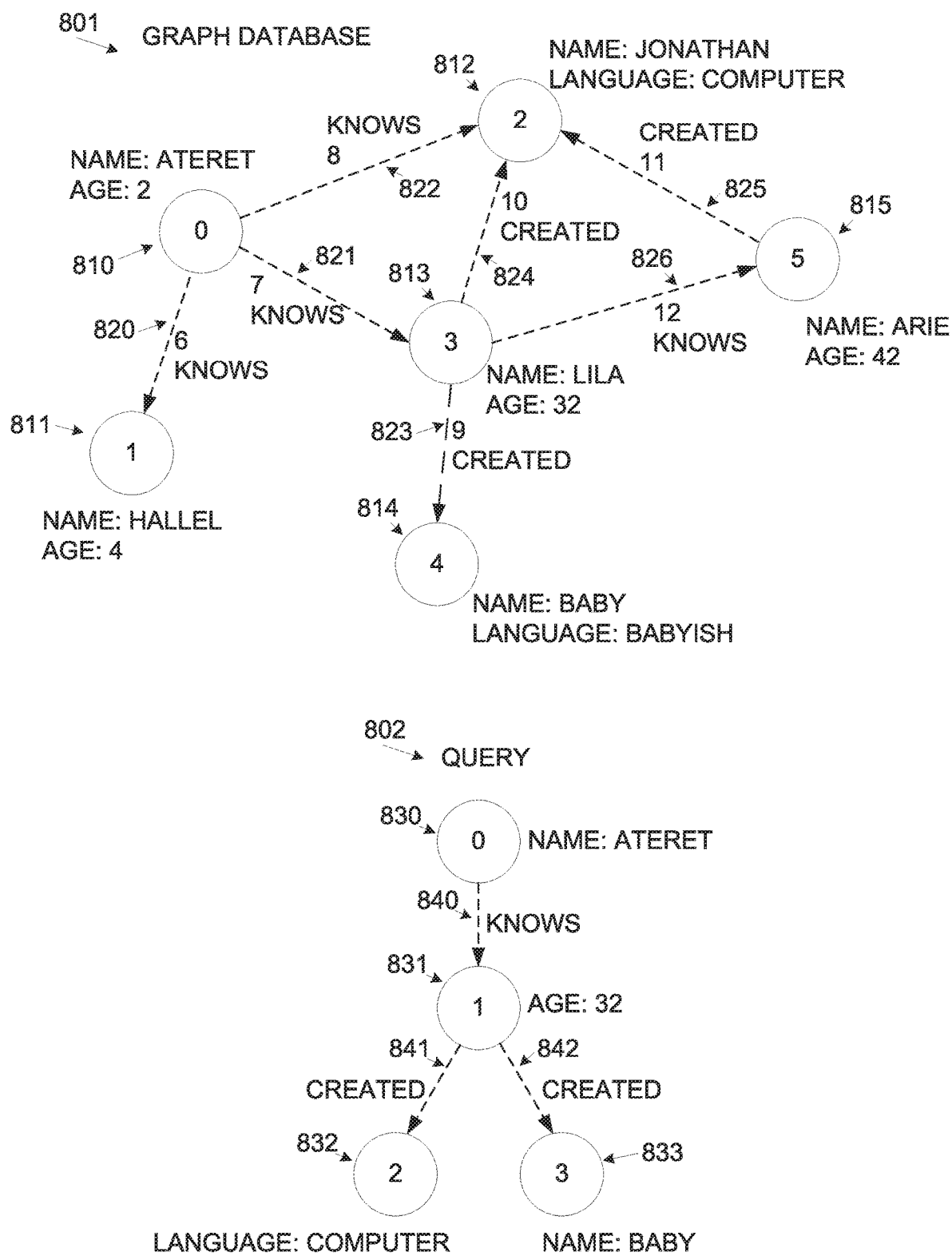
FIG. 8 is a schematic illustration of an exemplary graph database and an exemplary query, according to some embodiments of the present invention.

Reference is now made to FIG. 8 which is a schematic illustration of an exemplary graph database and an exemplary query, according to some embodiments of the present invention. A graph database 801 includes 6 nodes 810, 811, 812, 813, 814 and 815, each having a unique label 9, 1, 2, 3, 4 and 5 respectively. The relationships between the nodes 810, 811, 812, 813, 814 and 815 are defined by a set of 7 edges 820, 821, 822, 823, 824, 825 and 826, each having a unique label 6, 7, 8, 9, 10, 11 and 12 respectively. The edges 820, 821, 822 and 826 are of edge type KNOWS while the edges 823, 824 and 825 are of edge type CREATED. A query 802 to the graph database 801 includes 4 nodes 830, 831, 832 and 833 and 3 edges 840, 841 and 842 that define the relationship between the nodes 830, 831, 832 and 833. The node 830 is defined as the root node of the query 802. The edge 840 is of edge type KNOWS while the edges 841 and 842 are of edge type CREATED.

Processing the query 802 to the graph database 801 starts with receiving node 810 which is a base node within the database 801 which is the starting point for the search for match. Node 810 matches the root node 830 having the same label and value as specified in the root node 830, NAME: ATERET.

The next step is creating a plurality of search sub-graphs, each search sub-graph encodes a unique sub-graph of the graph database 801 and is represented with the unique sub-graph identifier. The structure of the sub-graph identifier is created according to the structure of the query 802 with respect to the graph database 801. Enumeration of the graph database 801 and the query 801 and the query 802 is performed using DFS. As the query has 3 edges 104, the sub-graph identifier is concatenated of 3 edge fields. The first edge field starting from the right is associated with the edge 840 which is of edge type KNOWS. The maximum number of edges 104 of edge type KNOWS that come out of any of the nodes 810, 811, 812, 813 and/or 814 is 3 (for node 810), requiring 2 bits for encoding. The second edge field of the sub-graph identifier is associated with the edge 841 which is of edge type CREATED. The maximum number of edges 104 of edge type CREATED that come out of any of the nodes 810, 811, 812, 813 and/or 814 is 2 (for node 813), requiring 1 bit for encoding. Only one bit is required for encoding 2 edges 104 since when no edges exist, an edge list of the respective node 103 is empty, for one edge 104 the edge list of the respective node 103 is set to binary 0 and for two edges 104 the list of the respective node 103 is set to binary 1. The third edge field of the sub-graph identifier is associated with the edge 842 which is of edge type CREATED, again requiring 1 bit for encoding. All together the size of the sub-graph identifiers is 4 bits which is sufficient for representing all sub-graphs within the graph database 801. The sub-graph identifiers are therefore the binary numbers (b) b0000, b0001, b0010, b0011, b0100, b0101, b0110, b0111, b1000, b1001, b1010, b1011, b1100, b1101, b1110 and b1111. Each search sub-graph is encoded by one of the above sub-graph identifiers. Each search sub-graph is then associated with one of the threads 310. Association is done by pairing the sub-graph identifier which may be represented via a binary notation, with the thread identifier having the same exact value. Each of the search sub-graphs is then processed by the associated thread 310. During processing, each thread 310 advances through the graph database 801 in the order indicated in its sub-graphs.

The search sub-graph represented and encoded by the path identifier b0000 starts at node 810. The first edge field is associated with the edge type KNOWS and its value is b00, the thread 310 processing the search sub-graph b0000 therefore moves through the edge 820 which is the first edge 104 of type KNOWS that goes out of the node 810 to reach the node 811. The node 811 does not have a label AGE that corresponds to the node 831 of the query 802 and therefore the thread 310 terminates with no match. The same is applicable to the search sub-graphs represented by the sub-graph identifiers b0100, b1000 and b1100.

The search sub-graph represented by the sub-graph identifier b0001 starts at node 810. The first edge field is associated with the edge type KNOWS and its value is b01, the thread 310 processing the search sub-graph b0001 therefore moves through the edge 821 which is the second edge 104 of type KNOWS that goes out of the node 810 to reach the node 813. The node 813 does have a label AGE with value 32 that matches the corresponding node 831 of the query 802 and therefore the thread 310 continues. The value of the second edge field of the sub-graph identifier b0001 is b0 and corresponds to the edge type CREATED, therefore the thread 310 processing the search sub-graph b0001 follows the edge 823 which is the first edge 104 of edge type CREATED that comes out of the node 813 and goes to the node 814. The node 814 does not have a label LANGUAGE with value COMPUTER that corresponds to the node 832 of the query 802 and therefore the thread 310 terminates with no match. The same is applicable to the search sub-graph represented by the sub-graph identifier b1001.

The search sub-graph represented by the sub-graph identifier b0101 starts at node 810. The first edge field is associated with the edge type KNOWS and its value is b01, the thread 310 processing the search sub-graph b0101 therefore moves through the edge 821 which is the second edge 104 of type KNOWS that goes out of the node 810 to reach the node 813. The node 813 does have a label AGE with value 32 that matches the corresponding node 831 of the query 802 and therefore the thread 310 continues. The value of the second edge field of the sub-graph identifier b0101 is b1 and corresponds to the edge type CREATED, therefore the thread 310 processing the search sub-graph b0101 follows the edge 824 which is the second edge 104 of edge type CREATED that comes out of the node 813 and goes to the node 812. The node 812 does have a label LANGUAGE with value COMPUTER that corresponds to the node 832 of the query 802 and therefore the thread 310 continues. The thread 310 processing the search sub-graph b0101 identifies there are unprocessed nodes 103 in the query 802 and moves to process the edge 842 and the node 833. The value of the third edge field of the sub-graph identifier b0101 is b0 and therefore the thread 310 processing the search sub-graph b0101 follows the edge 823 of edge type CREATED that comes out of the node 813 and goes to the node 814. The node 814 does have a label NAME with value BABY that corresponds to the node 833 of the query 802 and therefore the thread 310 processing the search sub-graph b0101 identifies a match of the query 802 within the graph database 801.

The search sub-graph represented by the path identifier of b1101 starts at node 810. The first edge field is associated with the edge type KNOWS and its value is b01, the thread 310 processing the sub-graph b1101 therefore moves through the edge 821 which is the second edge 104 of type KNOWS that goes out of the node 810 to reach the node 813. The node 813 does have a label AGE with value 32 that matches the corresponding node 831 of the query 802 and therefore the thread 310 continues. The value of the second edge field of the sub-graph identifier b1101 is b1 and corresponds to the edge type CREATED, therefore the thread 310 processing the search sub-graph b1101 follows the edge 824 of edge type CREATED that comes out of the node 813 and goes to the node 812. The node 812 does have a label LANGUAGE with value COMPUTER that corresponds to the node 832 of the query 802 and therefore the thread 310 continues. The thread 310 processing the search sub-graph b1101 identifies there are unprocessed nodes 103 in the query 802 and moves to process the edge 842 and the node 833. The value of the third edge field of the sub-graph identifier b0101 is b1 and therefore the thread 310 processing the search sub-graph b1101 follows the edge 824 which is the second edge 104 of edge type CREATED that comes out of the node 813 and goes to the node 812. The node 812 does not have a label NAME with value BABY that corresponds to the node 833 of the query 802 and therefore the thread 310 terminates with no match.

The search sub-graph represented by the unique sub-graph identifier of b0010 starts at node 810. The first edge field is associated with the edge type KNOWS and its value is b10, the thread 310 processing the search sub-graph b0010 will therefore move through the edge 822 which is the third edge 104 of type KNOWS that goes out of the node 810 to reach the node 812. The node 812 does not have a label AGE that corresponds to the node 831 of the query 802 and therefore the thread 310 terminates with no match. The same is applicable to the search sub-graph represented by the sub-graph identifiers of b0110, b1010 and b1110.

The thread 310 processing the search sub-graph represented by the unique sub-graph identifier b0011 identifies there is no fourth edge 104 of type KNOWS that goes out of the node 810 and terminates. The same is applicable to the search sub-graph represented by the sub-graph identifiers b0111, b1011 and b1111.

According to some embodiments of the present invention, there are provided systems and methods for creating a graph database layout in memory that is organized to support the systems and methods described herein for processing a query to a graph database. The graph database 101 is laid out in memory and is organized through several data structures to allow efficient processing of the query 102 to the graph database 101. The data structures include an array that is holding information of the plurality of nodes 103 of the graph database 101, an array that holds information on the data items that are stored within each of the plurality of nodes 103 of the graph database and an array holding information on the plurality of edges 104 of the graph database 101. The data structures enable the plurality of search modules 302 executed by the plurality of threads 310 to easily navigate through the graph database 101. The process of laying out the graph database 101 in memory is performed once and may serve subsequent queries 102. The layout of the graph database 101 needs to be recreated when the database is altered and/or updated.

Optionally, the graph database is an XML database and/or an XML document.

More optionally, the graph database is an undirected graph. The undirected graph database having a plurality of undirected edges associated with the plurality of nodes and identifying the relationships between the plurality of nodes. An undirected edge is interpreted and represented as two directed edges in the opposite directions. After the plurality of undirected edges is represented as directed edges, the plurality of nodes, edges and/or modes data arrays are constructed.

Figure 9:
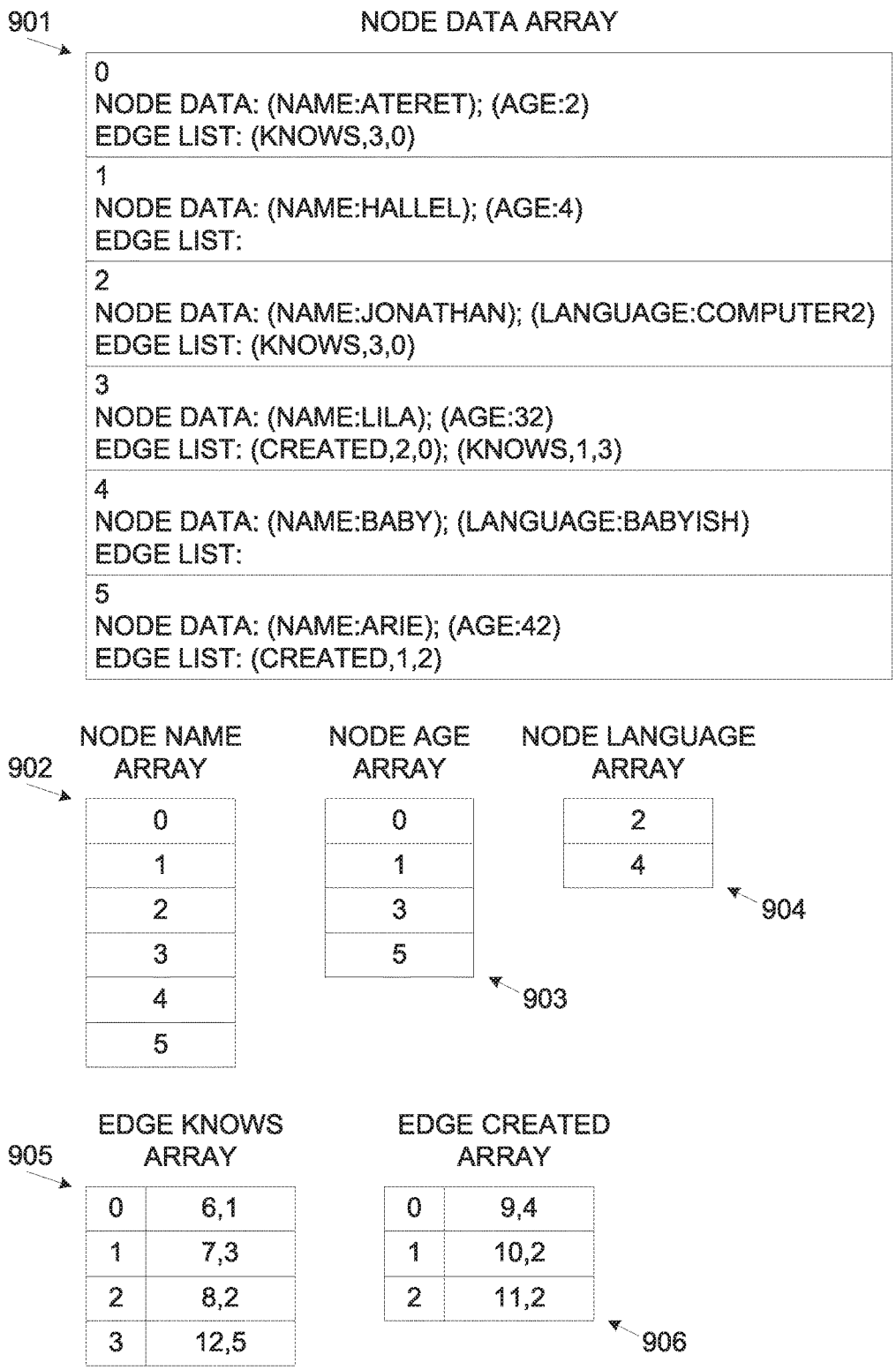
FIG. 9 is a schematic illustration of an exemplary layout of a graph database, according to some embodiments of the present invention.

Reference is now made once again to FIG. 8 and to FIG. 9 which is a schematic illustration of an exemplary layout of graph database, according to some embodiments of the present invention. The data structures described in FIG. 9 relate to the graph database 801. The graph database 801 is received in the form of arrays of vertices and edges as described in data structure definition, Expression 1 below.

Expression 1:

```
{
"vertices":[
    {"name":"Ateret","age":2,"_id":0,"_type":"vertex"}
    {"name":"Hallel","age":4,"_id":1,"_type":"vertex"}
    {"name":"Jonathan","lang":"computer","_id":2,"_type":"vertex"}
    {"name":"Lila","age":32,"_id":3,"_type":"vertex"}
    {"name":"Baby","lang":"babyish","_id":4,"_type":"vertex"}
    {"name":"Arie","age":42,"_id":5,"_type":"vertex"}
]
"edges":[
    {"_id":6,"_type":"edge","_outV":0,"_inV":1,"_label":"knows"}
    {"_id":7,"_type":"edge","_outV":0,"_inV":3,"_label":"knows"}
    {"_id":8,"_type":"edge","_outV":0,"_inV":2,"_label":"knows"}
    {"_id":9,"_type":"edge","_outV":3,"_inV":4,"_label":"created"}
    {"_id":10,"_type":"edge","_outV":3,"_inV":2,"_label":"created "}
    {"_id":11,"_type":"edge","_outV":5,"_inV":2,"_label":"created "}
    {"_id":12,"_type":"edge","_outV":3,"_inV":5,"_label":"knows"}
]
}
```

To support efficient processing of the query 802 and ease of navigation through the graph database 801, a plurality of data structures are created out of the received graph database 801 which is organized as described in Equation 1 above. A NODE DATA ARRAY 901 holds information for each of the nodes 810, 811, 812, 813, 814 and 815 of the graph database 801. Each entry in the node data array 901 is associated with one of the nodes 103 of the graph database 801 and includes node identifier, data items that are stored in the node, and an edge list. The edge list specifies the edge types of the edges 104 that are coming of the node 103 associated with the entry, the number of edges 104 of each edge type and a pointer the another array holding information on edges of a specific edge type. Each of the types of data present in the graph database 801 is assigned an array. A NODE NAME ARRAY 902 holds information on the nodes 103 in the graph database 801 that store data items of type NAME, i.e. nodes 810 (0), 811 (1), 812 (2), 813 (3), 814 (4) and 815 (5). A NODE AGE ARRAY 903 holds information on the nodes 103 in the graph database 801 that store data item of type AGE, i.e., nodes 810 (0), 811 (1), 813 (3) and 815 (5). A NODE LANGUAGE ARRAY 904 holds information on the nodes 103 in the graph database 801 that store data item of type LANGUAGE, i.e. nodes 812 (2) and 814 (4). Each of the edge types present in the graph database 801 is assigned an array. An EDGE KNOWS ARRAY 905 holds information on the edges 104 of type KNOWS that are present in the graph database 801. An EDGE CREATED ARRAY 906 holds information on the edges 104 of type CREATED that are present in the graph database 801. Pointers are provided in the NODE DATA ARRAY 901 that enable the plurality of search modules 302 to easily identify the layout and navigate through the graph database 801. For example, the first entry in EDGE CREATED ARRAY 906 is (9,4) and is pointed to by entry 3 in the NODE DATA ARRAY 901 through the edge list (CREATED,2,0)), meaning there are 2 edges 104 of type CREATED coming out of node 813 (3) and the first of them is located at the first entry of the EDGE CREATED ARRAY 906. The value of the first entry of the EDGE CREATED ARRAY 906 is (9,4) meaning the first edge 104 of type CREATED that comes out of nodes 813 (3) is the edge having identifier 9 and it goes to node 814 (4). The arrays 901, 902, 903, 904, 905 and/or 906 provide a quick indexing system allowing the search modules 302 to easily understand the structure of the graph database 801, identify the relative locations of nodes 103 with respect to each other and/or grasp the relationships between the plurality of nodes 103 to easily follow the sub-graph each of the search modules 302 is assigned with.

The method described herein, in which a thread ID determines its navigational behavior at run time, is applicable to a wide array of problems on graphs and other data structures, in which navigation over the structure is at the heart of the computational task, perhaps with additional numerical or logical computation as implied by the particular navigation pattern. This also holds for the extensions presented for the case in which the ID space is not large enough to encode all relevant navigations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term sales information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating a graph database layout in memory, comprising:
    constructing a node data array that includes a plurality of node entries, each said node entry is associated with one node of a plurality of graph database nodes constituting a graph database, wherein said node entry includes a node identifier and an edge list describing a plurality of edges going out of said one node;
    constructing a plurality of edge arrays that include a plurality of edge entries, each edge array is associated with a type of edge, wherein each edge entry includes an edge identifier of one of a plurality of edges of said edge type and a destination node of said one edge; and
    constructing a plurality of node data type arrays that include a plurality of data entries, each node data type array is associated with one of a plurality of data types associated with a plurality of data elements stored in at least one of said plurality of graph database nodes, wherein each data entry includes said node identifiers of at least one node in which said data element of said data type is stored.

2. The method of claim 1, wherein said graph database is an XML database.

3. The method of claim 1, wherein said graph database is an XML document.

4. The method of claim 1, wherein said graph database is expressed using resource description framework (RDF).

5. The method of claim 1, wherein said graph database is an undirected graph having a plurality of undirected edges, each of said plurality of undirected edges is represented as two directed edges in opposite directions, the method further comprising prior to constructing said node data array, constructing of said plurality of edge arrays and constructing plurality of said node data type arrays.

6. The method of claim 1, wherein said graph database is an undirected graph having a plurality of undirected edges, each one of said plurality of undirected edges is represented as two directed edges.

7. A system of creating a graph database layout in memory, comprising:
    at least one processor for executing a code for:
        constructing a node data array that includes a plurality of node entries, each said node entry is associated with one node of a plurality of graph database nodes constituting a graph database, wherein said node entry includes a node identifier and an edge list describing a plurality of edges going out of said one node;
        constructing a plurality of edge arrays that include a plurality of edge entries, each edge array is associated with a type of edge, wherein each edge entry includes an edge identifier of one of a plurality of edges of said edge type and a destination node of said one edge; and
        constructing a plurality of node data type arrays that include a plurality of data entries, each node data type array is associated with one of a plurality of data types associated with a plurality of data elements stored in at least one of said plurality of graph database nodes, wherein each data entry includes said node identifiers of at least one node in which said data element of said data type is stored.

8. The system of claim 7, wherein said graph database is an XML database.

9. The system of claim 7, wherein said graph database is an XML document.

10. The system of claim 7, wherein said graph database is expressed using resource description framework (RDF).

11. The system of claim 7, wherein said graph database is an undirected graph having a plurality of undirected edges, each of said plurality of undirected edges is represented as two directed edges in opposite directions, the at least one processor being further adapted for executing code for prior to constructing said node data array, constructing of said plurality of edge arrays and constructing plurality of said node data type arrays.

12. The system of claim 7, wherein said graph database is an undirected graph having a plurality of undirected edges, each one of said plurality of undirected edges is represented as two directed edges.

* * * * *